(12) United States Patent
Ling et al.

(10) Patent No.: US 11,303,187 B2
(45) Date of Patent: Apr. 12, 2022

(54) ENGINE-AND-ELECTRIC-MACHINE ASSEMBLY

(71) Applicant: Jing-Jin Electric Technologies Co., Ltd., Beijing (CN)

(72) Inventors: Xinliang Ling, Beijing (CN); Zhicheng Guo, Beijing (CN); Yao Zhou, Beijing (CN); Ping Yu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 35 days.

(21) Appl. No.: 17/017,125

(22) Filed: Sep. 10, 2020

(65) Prior Publication Data

US 2021/0083554 A1 Mar. 18, 2021

(30) Foreign Application Priority Data

Sep. 18, 2019 (CN) .......................... 201910882456.8

(51) Int. Cl.
*H02K 9/193* (2006.01)
*H02K 5/20* (2006.01)
(Continued)

(52) U.S. Cl.
CPC .......... *H02K 9/193* (2013.01); *F02B 63/042* (2013.01); *H02K 5/20* (2013.01); *H02K 7/003* (2013.01);
(Continued)

(58) Field of Classification Search
CPC .......... H02K 5/20; H02K 7/003; H02K 7/006; H02K 7/075; H02K 7/085; H02K 9/193;
(Continued)

(56) References Cited

U.S. PATENT DOCUMENTS 4,203,710 A * 5/1980 Farr .................. F02B 63/06
417/53
5,415,134 A * 5/1995 Stewart, Jr. ............ F01P 5/04
123/41.01
(Continued)

FOREIGN PATENT DOCUMENTS

CN 203384041 U 1/2014
CN 109017262 A 12/2018
(Continued)

OTHER PUBLICATIONS

European Search Report Issued in Related European Application No. 20191353.0 dated Feb. 3, 2021.
(Continued)

*Primary Examiner* — Pedro J Cuevas
(74) *Attorney, Agent, or Firm* — ArentFox Schiff LLP

(57) ABSTRACT

An engine-and-electric-machine assembly is provided that includes an engine and an electric machine, a crankshaft being provided in the engine, the crankshaft including a main body and an extension section that extends out to the exterior of the engine, the extension section forming a rotation shaft of the electric machine, and a rotor of the electric machine being mounted on the extension section. Moreover, a terminal of the rotation shaft is connected to a coolant pump, a rotor of the coolant pump is mounted to the rotation shaft, and while the rotation shaft is rotating the rotation shaft drives the coolant pump to provide coolant to the electric machine. By connecting the rotation shaft of the electric machine to the coolant pump, the assembly enables the pump to be highly integrated into the system and reduce manufacturing cost.

10 Claims, 3 Drawing Sheets

(51) Int. Cl.
  *H02K 7/00*    (2006.01)
  *H02K 7/075*   (2006.01)
  *H02K 7/08*    (2006.01)
  *H02K 24/00*   (2006.01)
  *F02B 63/04*   (2006.01)
  *H02K 11/21*   (2016.01)
  *B60K 6/24*    (2007.10)
  *B60K 6/26*    (2007.10)

(52) U.S. Cl.
  CPC .............. *H02K 7/006* (2013.01); *H02K 7/075* (2013.01); *H02K 7/085* (2013.01); *H02K 24/00* (2013.01); *B60K 6/24* (2013.01); *B60K 6/26* (2013.01); *H02K 11/21* (2016.01)

(58) Field of Classification Search
  CPC ....... H02K 11/21; H02K 24/00; F02B 63/042; B60K 6/24; B60K 6/26
  See application file for complete search history.

(56) References Cited

U.S. PATENT DOCUMENTS

| | | | |
|---|---|---|---|
| 5,713,427 A | 2/1998 | Lutz et al. | |
| 5,952,746 A | 9/1999 | Mittmann et al. | |
| 6,588,381 B2* | 7/2003 | Komorowski | F01L 1/02 123/41.44 |
| 6,668,766 B1* | 12/2003 | Liederman | F01P 5/12 123/198 C |
| 6,863,035 B2* | 3/2005 | Komorowski | F01L 1/02 123/41.44 |
| 7,047,914 B2* | 5/2006 | Komorowski | F01L 1/02 123/41.47 |
| 9,242,637 B2* | 1/2016 | Miyamoto | B60W 20/00 |
| 10,358,040 B1* | 7/2019 | Keller | B60L 50/61 |
| 10,391,854 B1* | 8/2019 | Keller | B60K 1/00 |
| 10,543,743 B1* | 1/2020 | Keller | B62D 11/005 |
| 10,589,618 B1* | 3/2020 | Keller | F04B 1/20 |
| 10,800,269 B1* | 10/2020 | Keller | B60L 50/61 |
| 11,015,516 B2* | 5/2021 | Guenter | F02B 29/0425 |
| 11,041,427 B2* | 6/2021 | Matsuda | F01P 7/14 |
| 11,092,063 B1* | 8/2021 | Bidner | F01P 3/16 |
| 11,142,887 B2* | 10/2021 | Watanabe | B60W 10/30 |
| 2002/0108588 A1* | 8/2002 | Komorowski | F01P 5/12 123/41.44 |
| 2003/0029392 A1* | 2/2003 | Komorowski | F01P 5/12 123/41.44 |
| 2003/0029393 A1* | 2/2003 | Komorowski | F01L 1/02 123/41.44 |
| 2015/0051768 A1* | 2/2015 | Miyamoto | B60W 30/1843 701/22 |
| 2015/0239332 A1 | 8/2015 | Okuda et al. | |
| 2019/0128179 A1 | 5/2019 | Kiyokami et al. | |
| 2019/0338696 A1* | 11/2019 | Guenter | B60K 11/06 |
| 2021/0062467 A1* | 3/2021 | Watanabe | B60K 20/15 |
| 2021/0078401 A1* | 3/2021 | Ling | B60K 6/405 |
| 2021/0155091 A1* | 5/2021 | Kiehn | B60K 11/02 |
| 2021/0268888 A1* | 9/2021 | Yu | H02K 7/108 |

FOREIGN PATENT DOCUMENTS

| | | |
|---|---|---|
| CN | 109441657 A | 3/2019 |
| CN | 110571976 A | 12/2019 |
| CN | 110601451 A | 12/2019 |
| JP | H07-224677 A | 8/1995 |
| JP | 2019-0686 A | 4/2019 |

OTHER PUBLICATIONS

Japanese Patent Office, Japanese Office Action dated Sep. 10, 2021 issued in corresponding Japanese patent application No. 2020-150582.

* cited by examiner

ENGINE-AND-ELECTRIC-MACHINE ASSEMBLY

CROSS-REFERENCE TO RELATED APPLICATION

This application claims priority to CN application No. 201910882456.8, filed Sep. 18, 2019, the disclosure of which is hereby incorporated by reference in its entirety.

TECHNICAL FIELD

The present disclosure relates to a powertrain assembly, and particularly relates to an engine-and-electric-machine assembly, which is used to drive a vehicle or generate electricity.

BACKGROUND

Hybrid electric vehicles have the advantages of energy saving, emission reduction and long endurance mileage, and are electric cars that are suitable for sustainable development. Currently, the engine-and-electric-machine assemblies of hybrid electric vehicles are mostly a simple mechanical integration of the engine and the electric machine, wherein the rear end of the engine is connected to a flywheel, and the input shaft of the electric machine is connected to the flywheel via a torsional shock absorber, which has disadvantages such as low integration level, too many component parts, high mass/weight, large volume, low reliability and high cost. They cannot satisfy the requirements to become full-scale production, and are difficult to meet miniaturization and light weight targets of the drive systems.

In the prior art, a range extender that has a higher level of integration has already been disclosed. As shown in FIGS. 1 and 2, it is particularly an engine-and-electric-machine assembly, comprising an engine 8 and an electric machine 9. The engine 8 is in fuel mode. The electric machine 9 may be an electric generator or an ISG electric machine, and may also be an electric motor. A crankshaft 7 is provided in the engine 8. The crankshaft 7 has an extension section 7-3 that extends out to the exterior of the engine 8. The extension section 7-3 forms a rotation shaft 6 of the electric machine 9. A rotor 3 of the electric machine 9 is mounted on the extension section 7-3.

The rotor of the electric machine 9 and the rotation shaft 6 are connected fixedly via a key, for example a spline or a flat key, or by interference fitting. As shown in FIG. 2, the crankshaft 7 has a key slot on the extension section 7-3. If the connection is via a spline, an external spline may be on the extension section 7-3, and an internal spline on the rotor of the electric machine 9, or vice versa.

The range extender adopts a structure that integrates the engine and the electric machine as one system, which enhances the integration level of the engine-and-electric-machine assembly, and effectively reduces the weight and the volume of the engine-and-electric-machine assembly. However, the energy utilization ratio is still required to be improved.

SUMMARY

With regards to the above mentioned problems in the prior art, the present disclosure provides an engine-and-electric-machine assembly, wherein the rotation shaft of the electric machine is connected to a coolant pump, and while rotating the rotation shaft drives the coolant pump to provide coolant to the electric machine, thereby improving the energy utilization ratio of the powertrain assembly.

To achieve the above objectives, the technical solutions of the present disclosure are realized as follows:

The present disclosure provides an engine-and-electric-machine assembly, comprising an engine and an electric machine, a crankshaft being provided in the engine, the crankshaft comprising a main body and an extension section that extends out of the exterior of the engine, the extension section forming a rotation shaft of the electric machine, and a rotor of the electric machine being mounted on the extension section, wherein a terminal of the rotation shaft is connected to a coolant pump, a rotor of the coolant pump is fixed to the rotation shaft, and while rotating the rotation shaft drives the coolant pump to provide coolant to the electric machine.

Optionally, a transition section is provided between the main body and the extension section of the crankshaft, and the rotor of the electric machine is connected to the end face of the transition section via a flange structure.

Optionally, the rotor of the electric machine comprises an iron-core support, a plurality of main connecting holes are provided at a middle part of the iron-core support, a plurality of secondary connecting holes are correspondingly provided at the end face of the transition section, and the main connecting holes and the secondary connecting holes are aligned and are fastened together by using bolts.

Optionally, a protrusion that faces the transition section is provided at the middle part of the iron-core support, and the main connecting holes are provided at the protrusion.

Optionally, a sleeve is provided at a middle part of the iron-core support, and the sleeve is interference-fitted to the extension section when the rotor of the electric machine is mounted on the extension section to guarantee that the sleeve is concentric with the rotation shaft.

Optionally, a synchro-resolver rotor is mounted onto the sleeve, or a synchro-resolver rotor is mounted onto the extension section.

Optionally, the extension section is provided with a plurality of stepped sections whose diameters sequentially and gradually decrease from a position of the extension section that is connected to the transition section to a terminal of the extension section, the sleeve is interference-fitted to a first stepped section of the stepped sections, the rotor of the coolant pump is mounted onto the last stepped section, and an auxiliary bearing is mounted onto one of the other stepped sections to support the rotation shaft.

Optionally, the rotor of the coolant pump and a fourth stepped section are connected by a key or a spline, or are connected by interference fitting.

Optionally, a sleeve is provided at a middle part of the iron-core support, and the sleeve is transition-fitted or clearance-fitted to the extension section when the rotor of the electric machine is mounted on the extension section.

Optionally, the transition section comprises a main body and a flange, the flange faces the rotor of the electric machine, a connecting neck is provided between the main body and the flange, and the diameter of the connecting neck is less than the diameter of the main body and the diameter of the flange.

The engine-and-electric-machine assembly, by employing the above structure configurations, has the following advantages:

By connecting the rotation shaft of the electric machine and the coolant pump, wherein the coolant pump may be an oil pump or a water pump and while rotating the rotation shaft drives the coolant pump, the present disclosure can provide coolant to the electric machine, thereby improving the energy utilization ratio of the powertrain assembly.

The coolant pump does not require a power source to operate, which reduces the energy consumption of the vehicle, highly integrates the pump, and reduces the manufacturing cost.

The present disclosure, by connecting the rotor of the electric machine and the crankshaft of the engine by using the flange structure, improves the strength of the connection between the rotor and the crankshaft, optimizes the moment transmission structure between the rotor and the crankshaft, prevents connection failure due to key damage, and increases the service life of the assembly.

Figure 1:
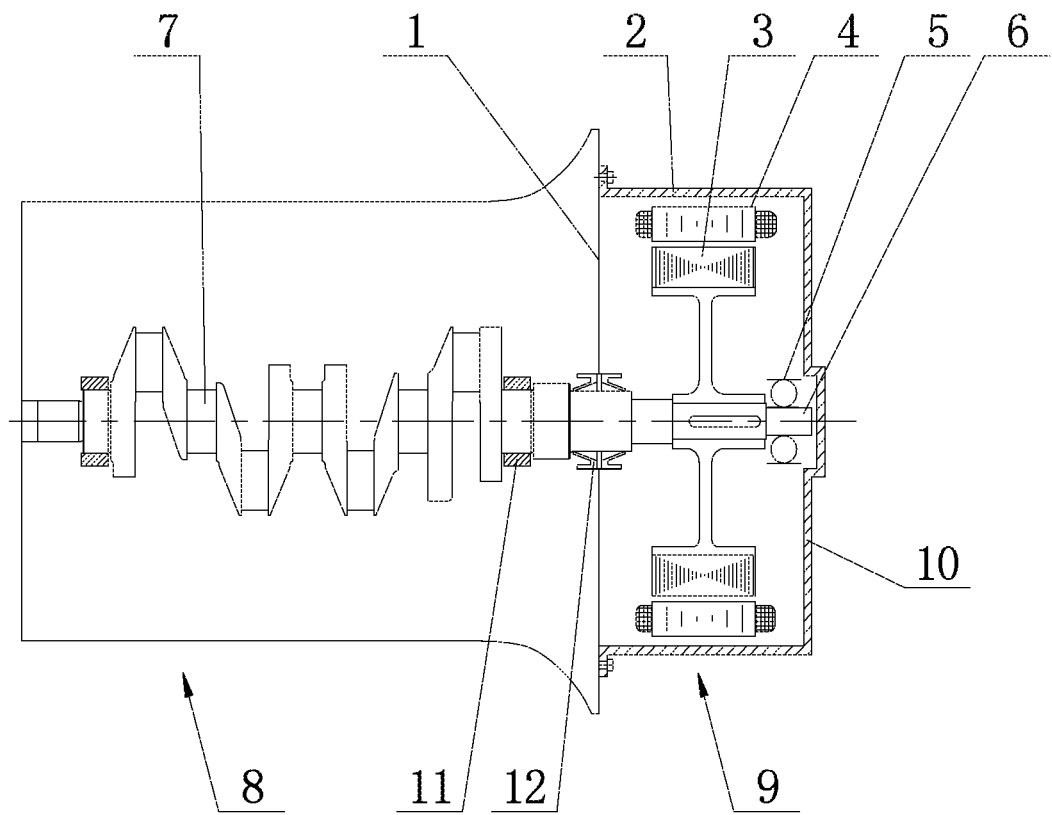
FIG. 1 is a schematic diagram of a connecting structure of an engine and an electric machine in the prior art.
Figure 2:
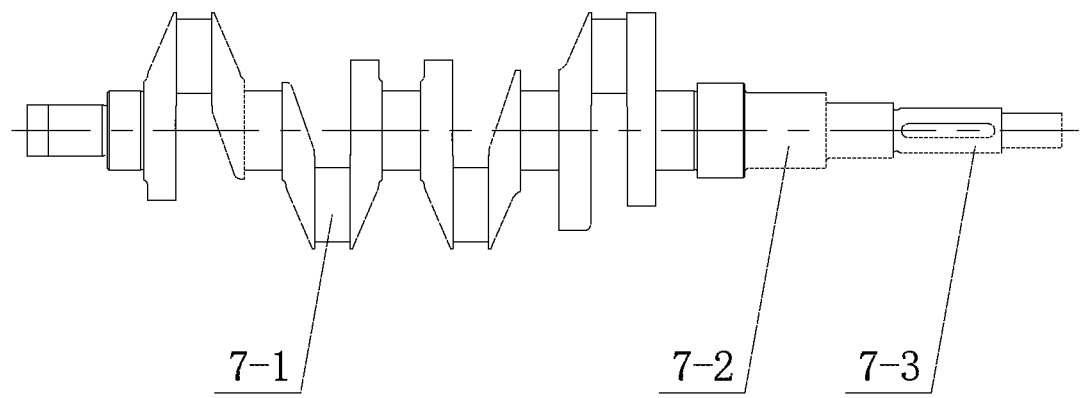
FIG. 2 is a schematic structural diagram of a crankshaft in the prior art.

in the drawings: 1. cylinder block; 2. housing; 3. rotor; 4. stator; 5. auxiliary bearing; 6. rotation shaft; 6-1. first stepped section; 6-2. second stepped section; 6-3. third stepped section; 6-4. fourth stepped section; 7. crankshaft; 7-1. main body; 7-2. transition section; 7-3. extension section; 8. engine; 9. electric machine; 10. right end cap; 11. sliding bearing; 12. double oil seal; 13. rotor of coolant pump; 14. stator of coolant pump; 15. synchro-resolver rotor; 16. synchro-resolver stator; 17. iron-core support; and 17-1. sleeve.

DETAILED DESCRIPTION

In order to present the objectives, the technical solutions and the advantages of the present disclosure clearer, the embodiments of the present disclosure will be described below in further detail in conjunction with the drawings.

The First Embodiment

Figure 3:
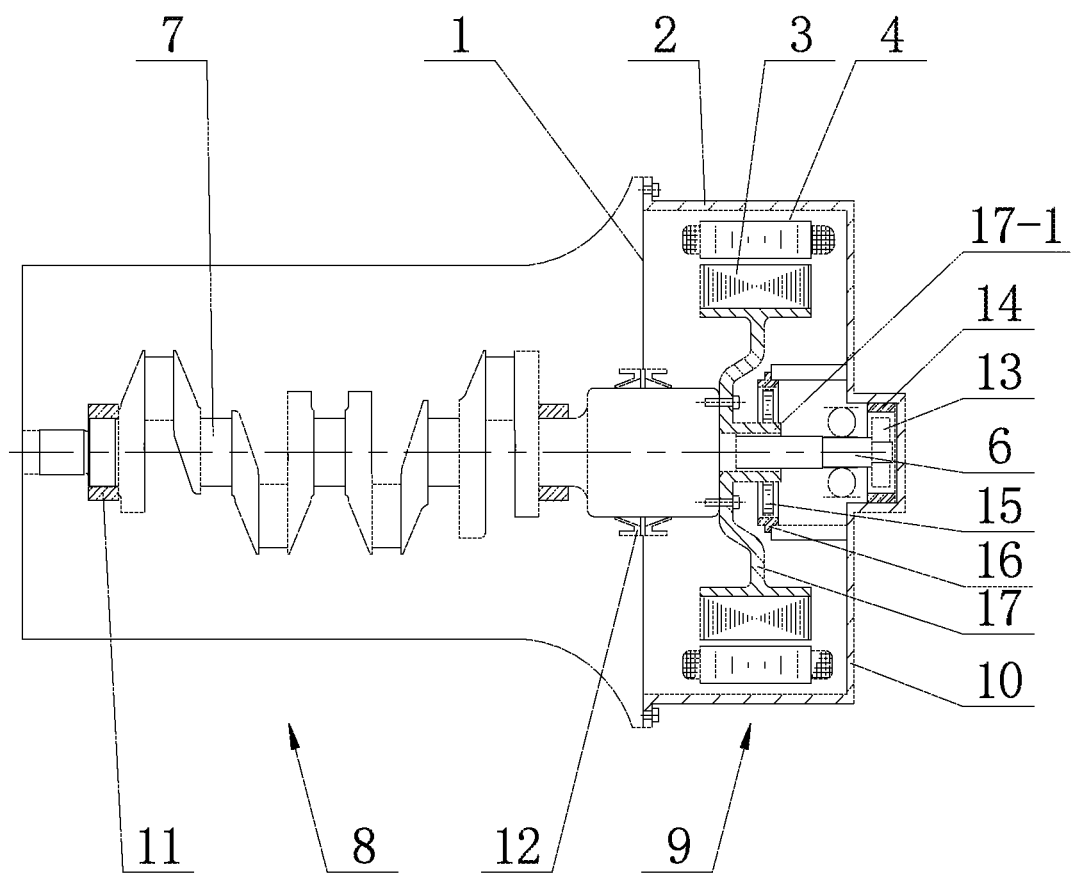
FIG. 3 is a schematic diagram of the connecting structure of the engine and the electric machine according to the first embodiment of the present disclosure.
Figure 4:
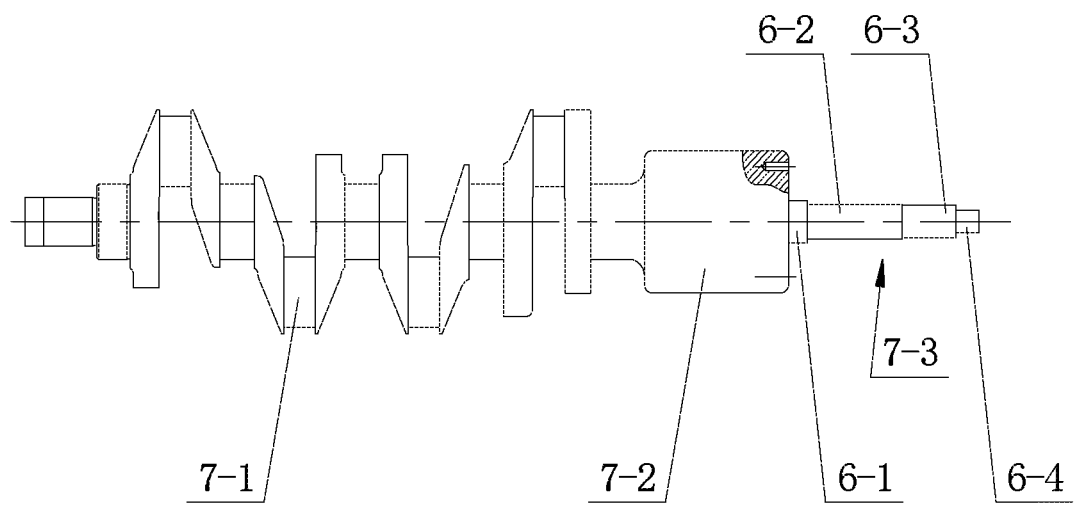
FIG. 4 is a schematic structural diagram of the crankshaft according to the first embodiment of the present disclosure.

As shown in FIGS. 3 and 4, in the first embodiment of the present disclosure, an engine-and-electric-machine assembly comprises an engine 8 and an electric machine 9. The engine 8 is in fuel mode. The electric machine 9 may be an electric generator or an ISG electric machine, and may also be an electric motor.

A crankshaft 7 is provided in the engine 8. The crankshaft 7 is provided with an extension section 7-3 that extends out to the exterior of the engine 8. The extension section 7-3 forms a rotation shaft 6 of the electric machine 9. A rotor 3 of the electric machine 9 is mounted on the extension section 7-3.

The terminal of the rotation shaft 6 is connected to a coolant pump. The rotor of the coolant pump is mounted onto the rotation shaft 6. While rotating, the rotation shaft 6 drives the coolant pump to provide coolant to the electric machine 9.

The coolant may be oil or water. The coolant pump may be a cycloid-rotor/gerotor pump. As shown in FIGS. 3 and 4, the rotor 13 of the coolant pump is mounted onto a fourth stepped section 6-4 of the rotation shaft 6, and a stator 14 of the coolant pump is mounted onto a housing 2. When the crankshaft 7 is rotating, the crankshaft 7 can drive the coolant pump to pump the coolant into the housing of the electric machine 9, to cool the electric machine 9.

A transition section 7-2 is provided between a main body 7-1 of the crankshaft 7 and the extension section 7-3. The rotor of the electric machine 9 is connected to an end face of the transition section 7-2 via a flange structure. The end face of the transition section 7-2 is a flush face, which can guarantee that, after the mounting of the rotor of the electric machine 9, the rotor does not incline.

The transition section 7-2 is provided originally for a sealing structure. A double oil seal 12 seals a spacing between the transition section 7-2 and a sealing slot on the cylinder block 1, thereby sealing the engine 8 and the electric machine 9 in both directions. By connecting the transition section 7-2 via the flange, the strength of the connection between the crankshaft 7 and the rotor of the electric machine 9 can be improved.

Particularly, the rotor of the electric machine 9 comprises an iron-core support 17. A winding or a magnetic steel is provided on the circumference of the iron-core support 17. A plurality of main connecting holes are provided at the middle part of the iron-core support 17. A plurality of secondary connecting holes are correspondingly provided at the end face of the transition section 7-2. The main connecting holes and the secondary connecting holes are aligned and are fastened together by using bolts. The main connecting holes are unthreaded holes. The secondary connecting holes are threaded holes. The numbers of the main connecting holes and the secondary connecting holes may be selected to be 6-12.

As shown in FIG. 3, in order to approach the transition section 7-2 to facilitate the connection, a protrusion that faces the transition section 7-2 is provided at the middle part of the iron-core support 17, and the main connecting holes are provided at the protrusion. Therefore, the position for the winding of the rotor and the stator are not required to be provided to the left, thereby avoiding the other components inside the electric machine 9, to leave the room for the installation of the other components.

A sleeve 17-1 is provided at the middle part of the iron-core support 17. Preferably, the sleeve 17-1 is interference-fitted to the extension section 7-3 where the rotor of the electric machine 9 is mounted onto the extension section 7-3 to guarantee that the sleeve 17-1 is concentric with the rotation shaft 6.

In order to facilitate the assembling, before the rotor of the electric machine is mounted to the extension section 7-3, the sleeve 17-1 may be heated to cause the inner diameter of the sleeve 17-1 to be greater than the external diameter of the extension section 7-3, and after the assembly is cooled, the interference fitting between the sleeve 17-1 and the extension section 7-3 can be formed.

In order to detect the rotation angle of the rotor of the electric machine 9, a synchro-resolver rotor 15 is mounted onto the sleeve 17-1. The synchro-resolver stator 15 is required to be mounted on the housing 2. The synchro-resolver rotor 15 may also be mounted onto the extension section 7-3, in which case the length of the sleeve 17-1 may be reduced accordingly.

As shown in FIG. 4, the extension section 7-3 is provided with a first stepped section 6-1, a second stepped section 6-2, a third stepped section 6-3 and a fourth stepped section 6-4, whose diameters sequentially and gradually decrease from the position of the extension section 7-3 that is connected to the transition section 7-2 to the terminal of the extension section 7-3. The sleeve 17-1 is interference-fitted to the first stepped section 6-1. An auxiliary bearing 5 is mounted fixedly to the third stepped section 6-3 to support the rotation shaft 6. The rotor of the coolant pump is mounted onto the fourth stepped section 6-4. Alternatively, the synchro-resolver rotor 15 may be mounted onto the second stepped section 6-2, and, if the fourth stepped section 6-4 can protrude out of the coolant pump, may also be mounted to the tail end of the fourth stepped section 6-4.

Particularly, the rotor 13 of the coolant pump is mounted onto the fourth stepped section 6-4 via a key or a spline, or by interference fitting.

Alternatively, the sleeve 17-1 and the extension section 7-3 may be connected by transition fitting or clearance fitting, whereby the sleeve 17-1 and the extension section 7-3 can be more easily assembled. Similarly, in order to facilitate the assembling, before the rotor of the electric machine is mounted to the extension section 7-3, the sleeve 17-1 may be heated to cause the inner diameter of the sleeve 17-1 to be greater than the external diameter of the extension section 7-3, and after the assembly is cooled the transition fitting or clearance fitting between the sleeve 17-1 and the extension section 7-3 can be formed.

In the present embodiment, the engine 8 and the electric machine 9 are integrated, and the components for the connection between an electric machine and an engine in conventional solutions, such as a flywheel and a torsional shock absorber, are not needed, which results in less component parts, a smaller volume, lighter in weight and a more compact structure.

In order to further reduce the parts and reduce the weight, in the present embodiment, the engine 8 and the electric machine 9 are provided adjacent, and the left end of the housing 2 is directly mounted to the cylinder block 1 of the engine, and, particularly, mounted to a front flange face of the cylinder block 1, to form a fixed sealing face.

The electric machine 9 is further provided with a right end cap 10, and the housing 2 of the electric machine 9 is manufactured together with the right end cap 10. Such a design can simplify the housing structure of the electric machine 9, and further achieve a higher level of integration.

In the electric machine 9 a left end cap is eliminated, which can reduce the axial length of the engine-and-electric-machine assembly.

As shown in FIG. 3, a flange is provided at one end of the housing 2 of the electric machine 9 that is connected to the cylinder block 1 of the engine 8, and is connected to the cylinder block 1 of the engine 8 via bolts, and the cylinder block 1 of the engine 8 is required to be provided with threaded holes. A sealing structure is provided at the connection, for example a sealing ring, to seal the interior of the housing of the electric machine 9.

A double oil seal 12 is provided at the position where the engine 8 and the electric machine 9 abut, to seal the engine 8 and the electric machine 9 in both directions. The double oil seal 12 may be provided on the cylinder block 1 of the engine 8, and correspondingly the cylinder block 1 of the engine 8 is required to be provided with a sealing slot to mount a sealing element.

As shown in FIG. 4, the double oil seal 12 seals a spacing between the transition section 7-2 and the sealing slot on the cylinder block 1, thereby sealing bidirectionally the engine 8 and the electric machine 9.

As shown in FIG. 3, a bearing seat is provided at the right end cap 10 of the electric machine 9, and is used to mount the auxiliary bearing 5 to support the rotation shaft 6 of the electric machine 9. The auxiliary bearing 5 and the rotation shaft 6 are connected by transition fitting or interference fitting, to reduce the radial runout of the rotor 3, to guarantee that the air gap of the electric machine does not vary greatly.

The crankshaft 7 is provided with a sliding bearing 11 at the position where the engine 8 and the electric machine 9 abut. The sliding bearing 11 may be considered as a bearing used commonly by the crankshaft 7 and the rotation shaft 6.

In the present embodiment, the electric machine 9 may be a permanent magnet electric machine, an induction electric machine, a hybrid excited electric machine or a switch reluctance electric machine, and the stator 4 of the electric machine 9 may employ a distributed winding or a concentrated winding.

An oil channel or a water channel is provided inside the housing 2 of the electric machine 9, wherein if the cooling mode is oil cooling an oil channel is required to be provided, and if the cooling mode is water cooling a water channel is required to be provided.

Radiating ribs may be provided on the outer side of the housing 2 of the electric machine 9, to improve the effect of heat dissipation.

By connecting the rotation shaft of the electric machine and the coolant pump, wherein the coolant pump may be an oil pump or a water pump and while rotating the rotation shaft drives the coolant pump to operate, the present embodiment can provide the cooling fluid to the electric machine, thereby improving the energy utilization ratio of the powertrain assembly.

The coolant pump does not require a power source for operation, which reduces the energy consumption of the vehicle, highly integrates the pump, and reduces the manufacturing cost.

The present embodiment, by connecting the rotor of the electric machine and the crankshaft of the engine by using the flange structure, improves the strength of the connection between the rotor and the crankshaft, optimizes the moment transmission structure between the rotor and the crankshaft, prevents connection failure due to key damage, and increases the service life of the assembly.

The Second Embodiment

Figure 5:
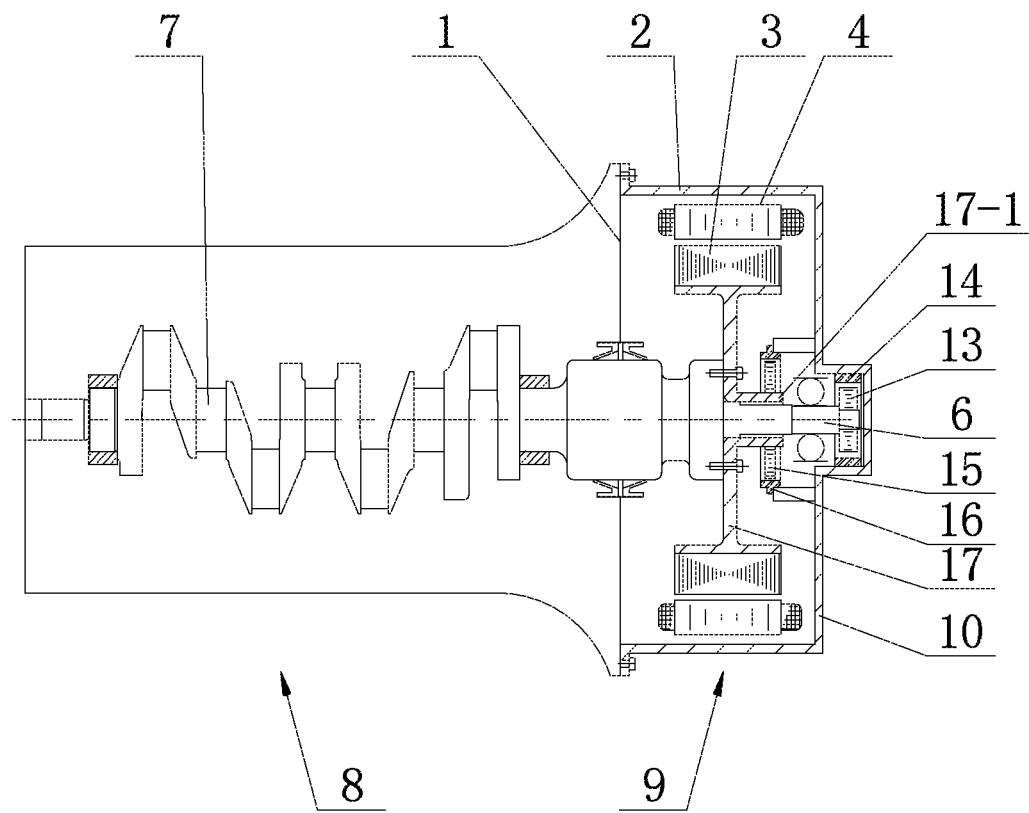
FIG. 5 is a schematic diagram of the connecting structure of the engine and the electric machine according to the second embodiment of the present disclosure.
Figure 6:
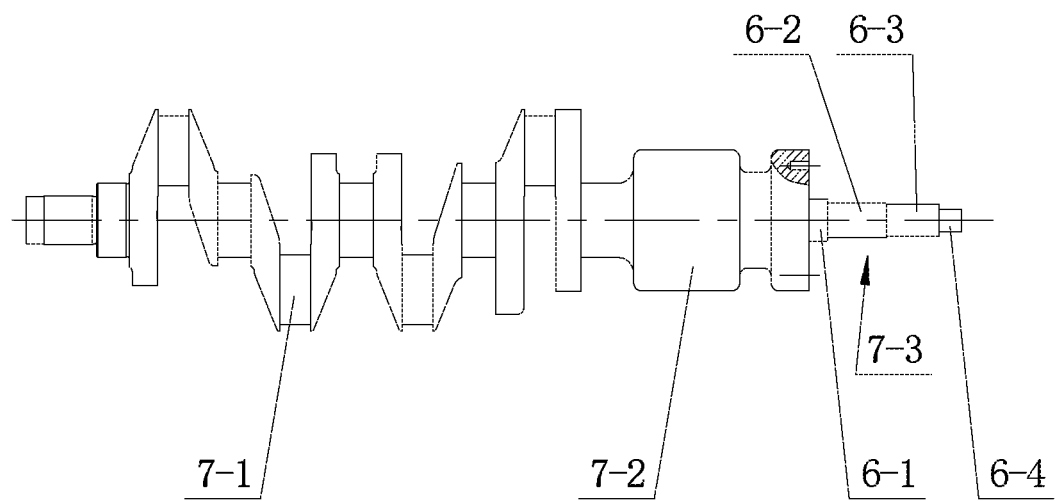
FIG. 6 is a schematic structural diagram of the crankshaft according to the second embodiment of the present disclosure.

FIGS. 5 and 6 show the second embodiment of the present disclosure. In the present embodiment, the transition section 7-2 comprises a main body and a flange, the flange faces the rotor of the electric machine 9, a connecting neck is provided between the main body and the flange, and the diameter of the connecting neck is less than the diameter of the main body and the diameter of the flange.

As shown in FIG. 6, the secondary connecting holes are provided at the end face of the flange that faces the iron-core support 17, and the iron-core support 17 is connected fixedly to the flange via bolts.

In the present embodiment, the length of the transition section 7-2 is larger than that of the transition section 7-2 of the first embodiment to some extent, and therefore the iron-core support 17 is not required to be provided with a protrusion.

The connecting neck can reduce the weight of the transition section 7-2 while satisfying the structural strength.

The other structures of the engine-and-electric-machine assembly of the second embodiment of the present disclosure are the same as those of the first embodiment, and are not described repeatedly here.

The above are merely particular embodiments of the present disclosure. By the information of the present disclosure, a person skilled in the art can make other modifications or variations on the basis of the above embodiments. A person skilled in the art should understand that the above particular descriptions are only for the purpose of interpreting the present disclosure better, and the scope of invention of the present disclosure shall be subjected to the protection scope of the claims.

What is claimed is:

1. An engine-and-electric-machine assembly, comprising an engine and an electric machine, a crankshaft being provided in the engine, the crankshaft comprising a main body and an extension section that extends out to the exterior of the engine, the extension section forming a rotation shaft of the electric machine, and a rotor of the electric machine being mounted on the extension section, wherein a terminal of the rotation shaft is connected to a coolant pump, a rotor of the coolant pump is mounted onto the rotation shaft, and while the rotation shaft is rotating the rotation shaft drives the coolant pump to provide coolant to the electric machine.

2. The engine-and-electric-machine assembly according to claim 1, wherein a transition section is provided between the main body and the extension section of the crankshaft, and the rotor of the electric machine is connected to the end face of the transition section via a flange structure.

3. The engine-and-electric-machine assembly according to claim 2, wherein the rotor of the electric machine comprises an iron-core support, a plurality of main connecting holes are provided at a middle part of the iron-core support, a plurality of secondary connecting holes are correspondingly provided at the end face of the transition section, and the main connecting holes and the secondary connecting holes are aligned and are fastened together by using bolts.

4. The engine-and-electric-machine assembly according to claim 3, wherein a protrusion that faces the transition section is provided at the middle part of the iron-core support, and the main connecting holes are provided at the protrusion.

5. The engine-and-electric-machine assembly according to claim 2, wherein a sleeve is provided at a middle part of the iron-core support, and the sleeve is interference-fitted to the extension section when the rotor of the electric machine is mounted on the extension section to guarantee that the sleeve is concentric with the rotation shaft.

6. The engine-and-electric-machine assembly according to claim 5, wherein a synchro-resolver rotor is mounted onto the sleeve, or a synchro-resolver rotor is mounted onto the extension section.

7. The engine-and-electric-machine assembly according to claim 5, wherein the extension section is provided with a plurality of stepped sections whose diameters sequentially and gradually decrease from a position of the extension section that is connected to the transition section to a terminal of the extension section, the sleeve is interference-fitted to a first stepped section of the stepped sections, the rotor of the coolant pump is mounted to a last one stepped section, and an auxiliary bearing is mounted to one of the other stepped sections to support the rotation shaft.

8. The engine-and-electric-machine assembly according to claim 7, wherein the rotor of the coolant pump and a fourth stepped section are connected by a key or a spline, or are connected by interference fitting.

9. The engine-and-electric-machine assembly according to claim 2, wherein a sleeve is provided at a middle part of the iron-core support, and the sleeve is transition-fitted or clearance-fitted to the extension section when the rotor of the electric machine is mounted on the extension section.

10. The engine-and-electric-machine assembly according to claim 2, wherein the transition section comprises a main body and a flange, the flange faces the rotor of the electric machine, a connecting neck is provided between the main body and the flange, and a diameter of the connecting neck is less than the diameter of the main body and the diameter of the flange.

* * * * *